United States Patent
Lee

(10) Patent No.: US 7,321,979 B2
(45) Date of Patent: Jan. 22, 2008

(54) METHOD AND APPARATUS TO CHANGE THE OPERATING FREQUENCY OF SYSTEM CORE LOGIC TO MAXIMIZE SYSTEM MEMORY BANDWIDTH

(75) Inventor: Van Hoa Lee, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 10/763,077

(22) Filed: Jan. 22, 2004

(65) Prior Publication Data

US 2005/0166073 A1 Jul. 28, 2005

(51) Int. Cl.
*G06F 1/04* (2006.01)

(52) U.S. Cl. ........................... 713/600; 713/100

(58) Field of Classification Search ............... 713/600, 713/100
See application file for complete search history.

(56) References Cited

U.S. PATENT DOCUMENTS 5,867,658 A * 2/1999 Lee ........................... 709/222
5,867,702 A * 2/1999 Lee ............................. 713/1
6,643,792 B1 * 11/2003 Kurosawa ................... 713/501
7,096,377 B2 * 8/2006 Kumar et al. ............... 713/600

FOREIGN PATENT DOCUMENTS

| JP | 2000020462 | 1/2000 |
|---|---|---|
| JP | 2001100867 | 4/2001 |
| JP | 2003022145 | 1/2003 |

* cited by examiner

*Primary Examiner*—Chun Cao
*Assistant Examiner*—Albert Wang
(74) *Attorney, Agent, or Firm*—Duke W. Yee; Diana R. Gerhardt; Hope Shimabuku

(57) ABSTRACT

A method, apparatus, and computer instructions for changing an operating frequency for a system core logic used to interface to memory in the multi-processor data processing system. A determination is made as to whether the operating frequency should be changed from a default frequency to another frequency. Slave processors are placed in the multi-processor data processing system into a non-transactional mode, in response to determining the operating frequency should be changed from the default operating frequency to the another operating frequency. When the slave processors are in the non-transactional mode, the operating frequency is changed in the system core logic to other operating frequency by the master processor.

23 Claims, 2 Drawing Sheets

METHOD AND APPARATUS TO CHANGE THE OPERATING FREQUENCY OF SYSTEM CORE LOGIC TO MAXIMIZE SYSTEM MEMORY BANDWIDTH

BACKGROUND OF THE INVENTION

1. Technical Field

The present invention relates generally to an improved data processing system and in particular to a method and apparatus for processing data. Still more particularly, the present invention relates to a method, apparatus, and computer instructions for changing operating frequencies in a system core logic in a data processing system.

2. Description of Related Art

A data processing system contains many different components that are interconnected to each other through a communications system, such as a bus. These components include a processor, a memory, and various input/output (I/O) adapters or components. The processor executes instructions in a fashion regulated by a clock rate. Additionally, other components, such as the bus and memory, also operate at a selected clock rate. An internal clock is provided to regulate and synchronize the operation of these and other components within the data processing system.

Modern data processing systems have system memory architectures that support memory modules with different speeds in the same system. Memory modules may come in various configurations or forms. One currently used memory module configuration is a dual in-line memory module (DIMM). A data processing system may contain DIMMs running at two different memory speeds, such as 333 mHz and 400 mHz. The system core logic, also referred to as an I/O bridge, generates a clock signal used to drive data on the bus in the data processing system. This system core logic normally runs at a default base frequency to allow the system firmware to initialize the memory and other I/O subsystems. When a data processing system has only high speed DIMMs, it is desirable to move the core operating frequency of the system core logic to that of the high speed DIMMs to increase the bandwidth of the system memory. The operating frequency is often set through a basic input/output system (BIOS).

Dynamic switching of the core frequency is hazardous and must be carefully handled to avoid a system crash. The setting of this frequency is made more complicated if the data processing system cannot set the frequency from the BIOS. Additionally, when a data processing system has multiple processors, the possibility of a system crash increases when dynamic switching of the core frequency is attempted.

Therefore, it would be advantageous to have an improved method, apparatus, and computer instructions for dynamically changing the operating frequency of a data processing system to increase the bandwidth of the system memory in the data processing system.

SUMMARY OF THE INVENTION

The present invention provides a method, apparatus, and computer instructions for changing an operating frequency for a system core logic used to interface to memory in the multi-processor data processing system. A determination is made as to whether the operating frequency should be changed from a default frequency to another frequency. Slave processors are placed in the multi-processor data processing system into a non-transactional mode, in response to determining the operating frequency should be changed from the default operating frequency to the another operating frequency. When the slave processors are in the non-transactional mode, the operating frequency is changed in the system core logic to other operating frequency by the master processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
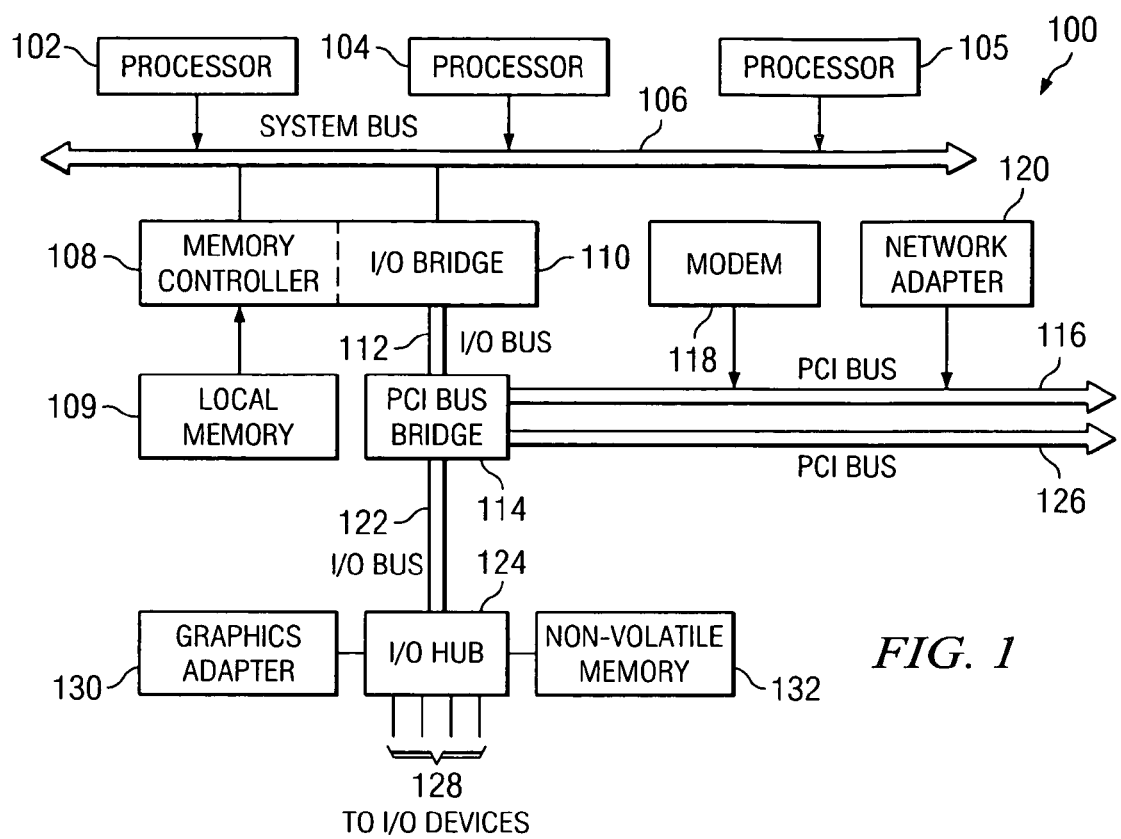
FIG. 1 is a block diagram of a data processing system in accordance with a preferred embodiment of the present invention.

Referring to FIG. 1, a block diagram of a data processing system is depicted in accordance with a preferred embodiment of the present invention. Data processing system 100 is an example of a multi-processor computer system. In these illustrative examples, data processing system 100 is a symmetric multiprocessor (SMP) system including processors 102, 104, and 105 connected to system bus 106. Although only three processors are depicted, the present invention may be implemented using a data processing system with other numbers of processors. Alternatively, a single processor system may be employed. In a single processor system, the processor will always be the master processor. Therefore, the method is reduced to that the master processor loads the frequency switching routine into its instruction cache, writes the control register to change frequency, and waits in a predefined delay interval for the change to take place.

Also connected to system bus 106 is memory controller/cache 108, which provides an interface to local memory 109. I/O bus bridge 110 is connected to system bus 106 and provides an interface to I/O bus 112. Memory controller 108 and I/O bus bridge 110 may be integrated as depicted. I/O bus bridge 110 contains the system core logic, including clock signal generation circuitry, such as a clock phase locked loop (PLL).

Peripheral component interconnect (PCI) bus bridge 114 connected to I/O bus 112 provides an interface to PCI local busses 116 and 126. A number of PCI-compliant adapters may be connected to PCI local busses 116 and 126. Typical PCI bus implementations will support four PCI expansion slots or add-in connectors. Communications links to other systems and devices may be provided through modem 118 and network adapter 120 connected to PCI local bus 116 through add-in boards. In this manner, data processing system 100 allows connections to multiple network computers.

PCI bus bridge 114 also provides an interface from the high speed I/O bus 112 to a relatively slower speed I/O bus 122. An I/O hub device 124, such as an AMD 8111 integrated circuit device (available from Advanced Micro Devices of Sunnyvale, Calif.), is connected to this relatively slower speed I/O bus, and provides connectivity to a plurality of I/O devices at 128, a memory-mapped graphics adapter 130, and non-volatile memory 132. Non-volatile memory 132 contains system boot-up or IPL code. Further in these illustrative examples, code for the processes of the present invention are stored in non-volatile memory 132. This non-volatile memory may take various forms, such as, for example, a non-volatile random access memory. These processes are used to implement a mechanism to allow for dynamic switching of the frequency of the clock generated for use in transferring data between different components in data processing system 100.

Those of ordinary skill in the art will appreciate that the hardware depicted in FIG. 1 may vary. For example, other peripheral devices, such as hard disk and optical disk drives and the like, also may be used in addition to or in place of the hardware depicted. The depicted example is not meant to imply architectural limitations with respect to the present invention.

The data processing system depicted in FIG. 1 may be, for example, an IBM eServer pSeries JS20 Blade system, a product of International Business Machines Corporation in Armonk, N.Y., running the Advanced Interactive Executive (AIX) operating system or LINUX operating system.

Figure 2:
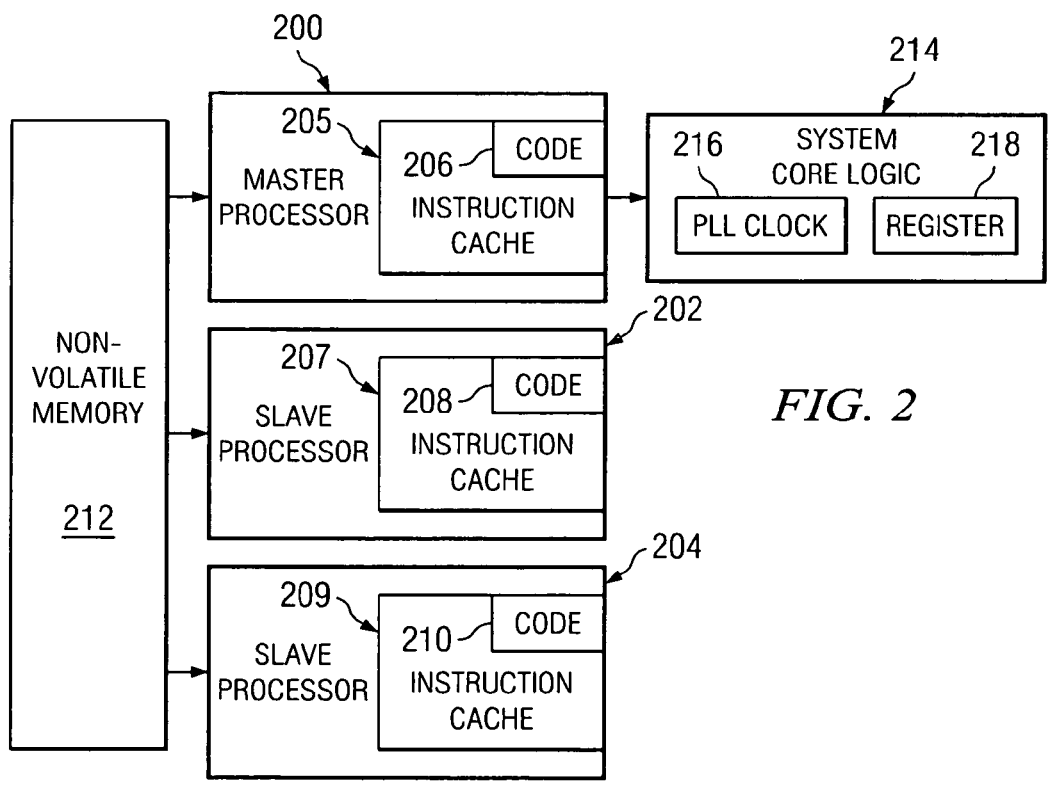
FIG. 2 is a diagram of components involved in changing the operating frequency of a system core logic in accordance with a preferred embodiment of the present invention.

Turning now to FIG. 2, a diagram of components involved in changing the operating frequency of a system core logic is depicted in accordance with a preferred embodiment of the present invention. In this illustrative example, master processor 200, slave processor 202, slave processor 204, download or retrieve code 206, code 208, and code 210 from non-volatile memory 212 into their respective internal instruction caches, instruction caches 205, 207, and 209. Master processor 200, slave processor 202, and slave processor 204 may be implemented as processor 102, processor 104, and processor 105 in data processing system 100 in FIG. 1. Non-volatile memory 212 may be implemented as non-volatile memory 132 in FIG. 1.

The present invention provides a method, apparatus, and computer instructions for changing the operating frequency in the system core logic to achieve a high bandwidth in the system memory. The mechanism of the present invention, in the illustrative examples, is initiated during the initial program load (IPL). System firmware is used to direct slave processors to enter a state to which these processors will not generate any transactions to the system core logic, such as I/O bridge 110 in FIG. 1, while a master processor attempts to change the core operating frequency. In these illustrative examples, the core operating frequency is generated in the form of a clock signal by a PLL clock. The frequency of this clock is controlled through a system register.

When the data processing system is powered on, one of the processors is selected to become master processor 200. Any selection mechanism may be used to select master processor 200. The remaining processors become the slave processors. Code 206, code 208, and code 210 are loaded into internal instruction caches by master processor 200, slave processor 202, and slave processor 204, respectively executing firmware instructions.

Thereafter, master processor 200 executes code 206 to identify the speeds of memory modules within the data processing system. When initial program mode occurs, the operating frequency for the data processing system is set to a low default frequency in system core logic 214. The clock signal at the default frequency is set by PLL clock 216. This frequency is set within register 218 in system core logic 214. System core logic 214 may be found within I/O bridge 110 in FIG. 1. This logic may be found in any component within a data processing system in which the component is used to provide an interface between the processor and the rest of the system, such as system memory and I/O subsystems.

Thereafter, master processor 200 directs slave processor 202 and slave processor 204 to enter a non-transactional mode through the system firmware code path for the slave processors which have been loaded into their internal instruction caches. The different processes performed by master processor 200 in this example are embodied in code 206. In this mode, the slave processors will not generate transactions to system core logic 214. If the slave processor were to generate a transaction on the system bus when the core logic undergoes its frequency change, the core logic will not be able to properly sample the bus signal to decode and acknowledge the transaction. The bus interface logic within the processor will detect a system bus error condition and assert the checkstop signal to halt the entire system. A non-transactional mode may be, for example, a sleep or nap mode for the slave processor. Alternatively, this non-transactional mode may be a mode in which a spin loop is entered by code 208 or code 210 being executed by slave processor 202 or slave processor 204, respectively, in response to receiving a command to enter the non-transactional mode from master processor 200. Of course, any other mechanism available for preventing a processor from generating a transaction may be used for the non-transactional mode.

Next, after slave processor 202 and slave processor 204 have entered the non-transactional mode, master processor 200 writes a value into register 218 to switch system core logic 214 to switch to a new operating frequency. After writing the values to register 218, master processor 200 enters a delay loop, while executing instructions within code 206 to prevent sending transactions to system core logic 214. After a period of time, master processor 200 exits the delay loop and checks register 218 to confirm that the frequency for PLL clock 216 in system core logic 214 has been changed to the desired operating frequency.

Register 218, in these illustrative examples, contains a frequency-related bit-field and status bit-field. The status bit-field is cleared when register 218 is written with new frequency value. The hardware will set the status bit in register 218 when the frequency has successfully been changed. If the frequency has been switched, master processor 200 wakes up slave processor 202 and slave processor 204 and then continues to initialize the data processing system.

For sleep/nap mode method, an internal decrement timer interrupt, or an external inter-processor interrupt may be used. When the sleep/nap mode is not available, or not being used as in a particular implementation, slave processors 202 and 204 stay in the spin loop watching their internal Timebase counters running. When master processor 200 wants to let slave processors 202 and 204 out of the loop, master processor 200 temporarily deactivates the system-wide timebase enable signal to stop all processors internal Timebase counters. Slave processors 202 and 204 see their Timebase counters stopped and exit the spin loop and continue further. Slave processors 202 and 204 inform master processor 200 through a hardware handshake register in the system core logic 214. Finally, master processor 200 will reactivate the timebase enable signal to allow the timebase counters to run again.

If the operating frequency has not been changed, master processor 200 may again attempt to set register 218 to change the operating frequency of PLL clock 216 in system core logic 214. Thereafter, master processor 200 will reenter the delay loop for a period of time and then check to see whether the operating frequency has been changed to the desired frequency. After some number of failed attempts, master processor 200 may attempt to finish initializing the data processing system using the default operating frequency.

Figure 3:
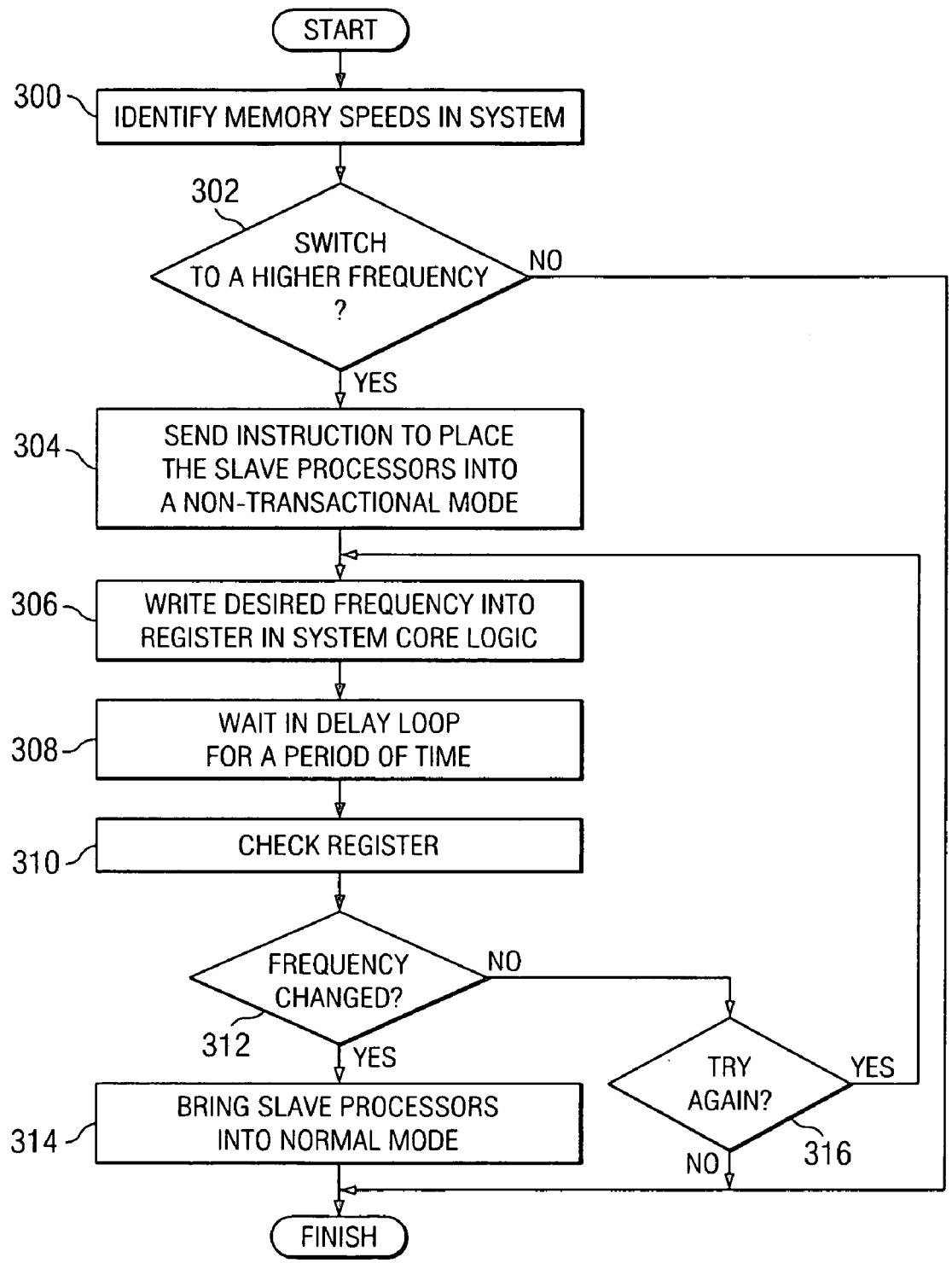
FIG. 3 is a flowchart of a process for changing the operating frequency of a system core logic identifying memory speeds in systems in accordance with a preferred embodiment of the present invention.

With reference now to FIG. 3, a flowchart of a process for changing the operating frequency of a system core logic identifying memory speeds in systems is depicted in accordance with a preferred embodiment of the present invention. The process illustrated in FIG. 3 may be implemented into a processor, such as master processor 200 in FIG. 2.

The process begins by identifying memory speeds in a system (step 300). The different memory modules may have different memory speeds, the normal clock frequency at which the memory modules operate. For example, one memory module may operate at 333 mHz, while another memory module operates at 400 mHz. Alternatively, the memory modules in the data processing system may all operate at the same frequency.

Next, a determination is made as to whether a switch to an optimal frequency needs to be made (step 302). In these examples, a switch to a higher frequency from the frequency currently being used is made if all to the memory modules support the higher frequency. Of course the frequency change could be made from a higher frequency to a lower frequency depending on the implementation.

If the switch is to be made, then instructions are sent to place the slave processors into a non-transactional mode (step 304). Then, the desired frequency is written into a register in system core logic (step 306).

Next, a wait in the delay loop occurs for a period of time (step 308). The master processor waits for a period of time to allow for the change in the operating frequency to occur. The process then proceeds to check the register (step 310). Next, a determination is made as to whether the frequency has changed based on checking the register (step 312). If the operating frequency has changed, slave processors are brought back into normal mode (step 314), with the process terminating thereafter.

Referring back to step 302 as described above, if a switch to a higher frequency is not made then the process terminates. Also, referring back to step 312, if the frequency has not changed then a determination is made as to whether to again try changing the operating frequency in the system core logic (step 316). If another try is to be made, then the process proceeds to step 306 as described above. If another try is not to be made, then the process terminates.

Thus, the present invention provides a method, apparatus, and computer instructions for changing or switching the operating frequency of the system core logic of the computer system which handles processor requests from the processor bus and the I/O master requests from the I/O bus to access the system main memory. In these illustrative examples, the operating frequency is changed by switching the operating frequency of the system core logic which consists of bus control logics for the processor bus, the I/O bus, and the system memory bus. If the operating frequency is to be changed, processors other than the processor performing the change are placed into a non-transactional mode. The operating frequency is then changed in the system core logic. In these illustrative examples, the frequency is changed by setting or writing a value into a register that controls a clock circuit, such as a PLL clock.

After the operating frequency has been changed, the processors are brought out of the non-transactional mode and system initialization continues. In this manner, the operating frequency for components in a data processing system may be dynamically changed without restarting the data processing system and avoiding errors that may cause a system crash.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a multi-processor data processing system, having at least one master processor, at least one slave processor, memory, and a system core logic used to interface the processors to the memory, for changing an operating frequency of the system core logic, the method comprising:

determining whether the operating frequency of the system core logic should be changed from a first frequency to a second frequency;

responsive to determining the operating frequency should be changed, placing the at least one slave processor into a non-transactional mode; and responsive to placing the at least one slave processor into the non-transactional mode, changing the operating frequency of the system core logic to the second frequency.

2. The method of claim 1 further comprising:

responsive to changing the operating frequency of the system core logic to the second frequency, placing the slave processors into a normal mode.

3. The method of claim 1, wherein the first frequency is a low default frequency, set by a phase locked loop clock in the system core logic, at power on.

4. The method of claim 1, wherein the determining step comprises:

determining, by the master processor, memory speeds of a plurality of memory modules within the memory;

determining a lowest frequency of the memory modules; and responsive to the lowest frequency being different from the first frequency, determining that the operating frequency of the system core logic should be changed from the first frequency to the second frequency, wherein the second frequency is the lowest frequency.

5. The method of claim 1, wherein the non-transactional mode comprises one of a sleep mode or a mode in which the slave processor is in a spin loop without generating any external bus transactions to the system core logic.

6. The method of claim 1, wherein the changing step comprises:

setting a register in the system core logic to a value of the second frequency;

entering, by the master processor, a delay loop to prevent sending transactions to the system core logic; and in response to termination of the delay loop, checking, by the master processor, the register in the system core logic to ensure the operating frequency of system core logic has been changed to the second frequency.

7. The method of claim 1, wherein the determining step, the placing step, and the changing step are performed by the master processor in the multi-processor data processing system.

8. The method of claim 1, wherein the multi-processor data processing system is a symmetric multi-processor data processing system.

9. A multi-processor data processing system, having at least one master processor, at least one slave processor, memory, and a system core logic used to interface the processors to the memory, for changing an operating frequency of the system core logic, the multi-processor data processing system, comprising:

determining means for determining whether the operating frequency of the system core logic should be changed from a first frequency to a second frequency;

placing means, responsive to determining the operating frequency should be changed for placing the at least one slave processor into a non-transactional mode; and changing means, responsive to placing the at least one slave processor into the non-transactional mode, for changing the operating frequency of the system core logic to the second frequency.

10. The multi-processor data processing system of claim 9, wherein the placing means is the first placing means and further comprising:

second placing means, responsive to changing the operating frequency of the system core logic to the second frequency, for placing the slave processors into a normal mode.

11. The multi-processor data processing system of claim 9, wherein the first frequency is a low default frequency, set by a phase locked loop clock in the system core logic, at power on.

12. The multi-processor data processing system of claim 9, wherein the determining means comprises:

determining means for determining, by the master processor, memory speeds of a plurality of memory modules within the memory;

determining means for determining a lowest frequency of the memory modules; and determining means, responsive to the lowest frequency being different from the first frequency, for determining that the operating frequency of the system core logic should be changed from the first frequency to the second frequency, wherein the second frequency is the lowest frequency.

13. The multi-processor data processing system of claim 9, wherein the non-transactional mode comprises one of a sleep mode or a mode in which the slave processor is in a spin loop without generating any external bus transactions to the system core logic.

14. The multi-processor data processing system of claim 9, wherein the changing means comprises:

setting means for setting a register in the system core logic to a value of the second frequency;

entering means for entering, by the master processor, a delay loop to prevent sending transactions to the system core logic; and checking means, in response to termination of the delay loop, for checking, by the master processor, the register in the system core logic to ensure the operating frequency of system core logic has been changed to the second frequency.

15. The multi-processor data processing system of claim 9, wherein the determining means, the placing means, and the changing means are located in the master processor in the multi-processor data processing system.

16. The multi-processor data processing system of claim 9, wherein the multi-processor data processing system is a symmetric multi-processor data processing system.

17. A computer program product in a recordable-type medium for a multi-processor data processing system, having at least one master processor, at least one slave processor, memory, and a system core logic used to interface the processors to the memory, for changing an, operating frequency of the system core logic, the computer program product comprising:

first instructions for determining whether the operating frequency of the system core logic should be changed from a first frequency to a second frequency;

second instructions, responsive to determining the operating frequency should be changed, for placing the at least one slave processor into a non-transactional mode; and third instructions, responsive to placing the at least one slave processor into the non-transactional mode, for changing the operating frequency of the system core logic to the second frequency.

18. The computer program product of claim 17 further comprising:

fourth instructions, responsive to changing the operating frequency of the system core logic to the second frequency, for placing the slave processors into a normal mode.

19. The computer program product of claim 17, wherein the first frequency is a low default frequency, set by a phase locked loop clock in the system core logic, at power on.

20. The computer program product of claim 17, wherein the first instructions comprises:

first sub-instructions for determining, by the master processor, memory speeds of a plurality of memory modules within the memory;

second sub-instructions for determining a lowest frequency of the memory modules; and third sub-instructions, responsive to the lowest frequency being different from the first frequency, for determining that the operating frequency of the system core logic should be changed from the first frequency to the second frequency, wherein the second frequency is the lowest frecqency.

21. The computer program product of claim 17, wherein the non-transactional mode comprises one of a sleep mode or a mode in which the slave processor is in a spin loop without generating any external bus transactions to the system core logic.

22. The computer program product of claim 17, wherein the third instructions comprises:

first sub-instructions for setting a register in the system core logic to a value of the second frequency;

second sub-instructions for entering, by the master processor, a delay loop to prevent sending transactions to the system core logic; and third sub-instructions, in response to termination of the delay loop, for checking, by the master processor, the register in the system core logic to ensure the operating frequency of system core logic has been changed to the second frequency.

23. A data processing system comprising:
a bus system;
a memory connected to the bus system, wherein the memory includes a set of instructions; and
a processing unit connected to the bus system, wherein the processing unit executes a set of instructions to determine whether the operating frequency of a system core logic should be changed from a first frequency to a second frequency; place an at least one slave processor into a non-transactional mode in response to determining the operating frequency should be changed; and change the operating frequency of the system core logic to the second frequency in response to placing the at least one slave processor into the non-transactional mode.

* * * * *